United States Patent [19]

Otten et al.

[11] Patent Number: 4,897,582

[45] Date of Patent: Jan. 30, 1990

[54] LINEAR DC MOTOR VIBRATION CONTROLLER

[75] Inventors: Thomas H. Otten, Indialantic; Warren H. Miller, Palm Bay; Willie T. Burton, Jr., Palm Bay; John W. Shipley, Palm Bay; Russell A. Johnson, Brandon; Jeffery R. Anderson, Palm Bay, all of Fla.

[73] Assignee: Harris Corp., Melbourne, Fla.

[21] Appl. No.: 773

[22] Filed: Jan. 6, 1987

[51] Int. Cl.$^4$ .................. B64G 1/38; G05B 11/58
[52] U.S. Cl. .................. 318/135; 244/164; 244/170; 310/12
[58] Field of Search ............ 244/164, 165, 170; 310/12, 13, 14, 15, 154; 318/114, 135, 489, 648, 649

[56] References Cited

U.S. PATENT DOCUMENTS

| | | | |
|---|---|---|---|
| 3,839,664 | 10/1974 | Dirks et al. | 318/135 |
| 4,361,776 | 11/1982 | Hayashi et al. | 310/254 |
| 4,424,948 | 1/1984 | Muhlfelder et al. | 244/170 |
| 4,463,300 | 7/1984 | Mayne et al. | 318/135 |
| 4,525,659 | 6/1985 | Imahashi et al. | 318/649 |

Primary Examiner—Patrick R. Salce
Assistant Examiner—D. L. Rebsch
Attorney, Agent, or Firm—Antonelli, Terry & Wands

[57] ABSTRACT

A linear force actuator system for stabilizing a support structure employs a linear dc motor whose primary winding is driven by a pulse width modulation control signal representative of a force input, through which the secondary member of the motor which acts as an inertial mass, is to be controllably translated. For improved control accuracy, the actuator system of the invention employs a pair of feedback loops, one of which monitors the current in the motor's primary winding to maintain a constant force output to the secondary member and a secondary of which monitors long term deviations from the center of the secondary member and corrects for centering offsets. An optoelectronic position sensing arrangement monitors the movement of the secondary member whereby precise control of commutation of the coils of the primary winding and a smooth translation of the secondary member are obtained.

29 Claims, 9 Drawing Sheets

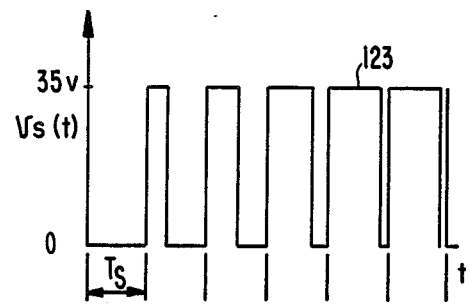
FIG. 10.
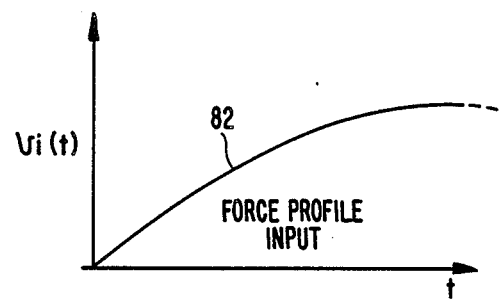
FIG. 11.
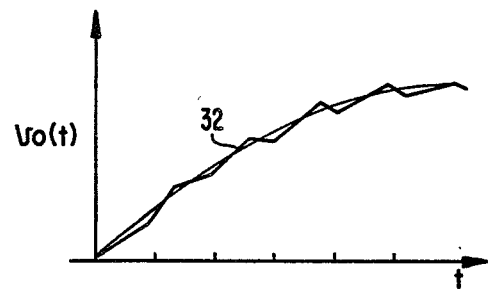
FIG. 12.
FIG. 13.
| COMMUTATION SEQUENCE STATE | A | B | C |
|---|---|---|---|
| 1 | + | − | 0 |
| 2 | 0 | − | + |
| 3 | − | 0 | + |
| 4 | − | + | 0 |
| 5 | 0 | + | − |
| 6 | + | 0 | − |
CURRENT INTO THE COILS IS POSITIVE (+)

LINEAR DC MOTOR VIBRATION CONTROLLER

FIELD OF THE INVENTION

The present invention relates in general to vibration control mechanisms and is particularly directed to a system for controlling the vibration of large space deployed structures through the use of a direct current motor linear actuator.

BACKGROUND OF THE INVENTION

Large structures, particularly those having a substantial linear configuration component, are subject to flexing or oscillation, which is particularly noticeable at opposite ends of the structure. For example, in a terrestrial environment, very tall building structures (skyscrapers) are subject to natural forces such as wind and geological vibrations, which cause the building to oscillate or sway. To effectively dampen or minimize the sway, it is common practice to employ an inertial compensation mechanism such as a system of translatable weights at the top of the building, which is operated so as to effectively impart a prescribed vibration behavior designed to effectively counter the sway.

Space deployed structures, however, unlike their earth-bound counterparts, are completely free to translate and rotate, and therefore require a precise inertial compensation mechanism for maintaining a stabilized orbital attitude. One device that has been employed for this purpose is the control moment gyro. Such a device, however, not only has limited translation control range (stroke) but also requires the addition of a rotational-to-linear conversion mechanism, which constitutes an orbital launch payload add-on. These drawbacks become particularly acute as the structure to be deployed is of a large, substantially rectilinear configuration, e.g. a long multi-truss framework adapted to support a variety of communication, sensor/scan probe and power modules

SUMMARY OF THE INVENTION

In accordance with the present invention the need for a precise linear motion control mechanism that produces large stroke displacement, has low harmonic distortion and may be easily coupled to a space deployed structure is satisfied by a linear movement controller that is adapted to impart a controlled low frequency linear force input to the structure by way of a vibration compensating linear actuator. Pursuant to the invention, the linear actuator comprises a longitudinally shaped, linearly translatable member which forms the secondary of a linear direct current (D.C.) electric motor and has distributed thereon a plurality of sequentially arranged magnetic pole pieces. The primary winding of the motor is formed of a pair of air-core wound driver coils, the lengths of which are relatively short compared with the linearly translatable secondary member. The driver coils are symmetrically arranged on opposite sides of the secondary member and supported on a framework that is mounted to the (spacecraft) structure whose attitude is to be stabilized. Because of its increased length (compared with the length of the primary winding) the movable secondary member has an increased mass and is therefore capable of imparting a greater dampening force to counter the vibration of the structure upon which the actuator is mounted. Preferably the range of travel (stroke) of the secondary member is 20% to 80% of the vibrational stroke of the vibrating structure being dampened. The magnitude of the mass of the secondary (which is effectively proportional to its length) is selected to provide a dampening stroke within this preferred range.

The coils of the primary winding of the D.C. motor have air cores, as contrasted with conventional linear motor configurations which employ an iron core, so that the primary winding is free of reluctance effects that would otherwise be present at the ends of a reduced length iron core structure and would interact with the magnetic pole pieces of the secondary member to induce an undesirable "cogging" of the movement of the secondary member.

Affixed to a side of the translatable secondary member is a set of reflective optically encoded position location tracks. As the secondary member is controllably translated by the magnetic field produced by the primary winding in response to a prescribed force input signal, optical sensors disposed adjacent to the path along which the translatable secondary member travels produce position output signals as the position location tracks are viewed by the optical sensors. These output signals, in turn, are used to control the energization (commutation) of the coils of the primary winding, so as to smoothly translate the secondary member relative to the location of the primary winding on the structure. One of the position location tracks is used to monitor the tendency of the secondary member to be effectively centered relative to the primary winding. If, due to noise, such as bearing friction, tilt of the secondary member, etc., the secondary member tends to spend more time in one direction of travel then the other, the signal produced by this "off center" position sensor is used to modify the force input representative signal and correct for the offset.

A primary driver control circuit has an output coupled to the primary coils and inputs coupled to receive a force input representative signal and outputs of the optical sensor elements. In response to an inertial control signal which is used to excite a prescribed oscillation condition in the secondary member, the control circuit generates pulse width modulated coil driver output signals through which the primary coils are energized so as to displace the secondary member. As the secondary member is displaced, the outputs of the optical sensors monitor the encoded position reflective tracks and selectively switch the application of energizing current to the coils of the primary winding and thereby commutate their magnetic fields to which the sequentially arranged pole pieces of the secondary member respond. As a result, the secondary member is caused to oscillate smoothly and impart to the structure the intended vibration compensation.

BRIEF DESCRIPTION OF THE DRAWINGS

FIGS. 10, 11 and 12 are waveforms for explaining the operation of the coil driver shown in FIG. 9;

FIG. 13 shows a commutation sequence matrix for controlling the operation of the coil driver circuitry shown in FIG. 9;

DETAILED DESCRIPTION

Figure 1:
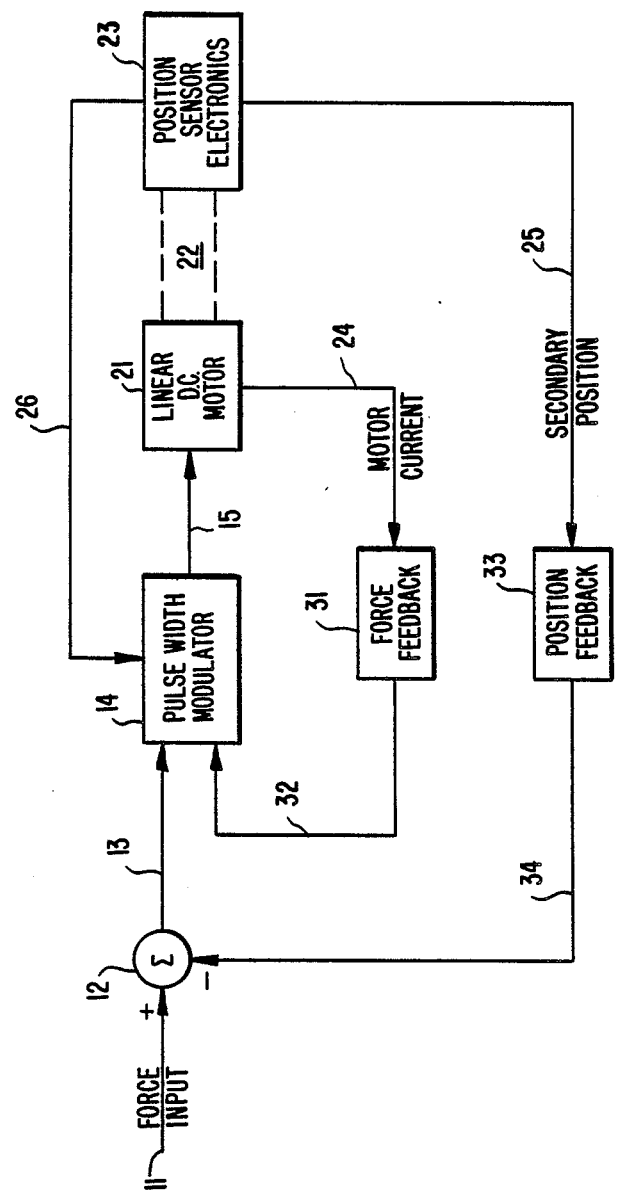
FIG. 1 is a functional block diagram of a linear dc motor vibration controller in accordance with the present invention.

Referring now to FIG. 1, a functional block diagram of the linear dc motor vibration controller in accordance with the present invention is shown as a dual closed loop control system having a force input link 11 coupled to a first summing node 12. Force input link 11 may be derived from any suitable signal source whose output corresponds to an oscillation control signal which is employed to drive primary winding of the dc motor and thereby controllably excite its secondary member into linear oscillation for the purpose of stabilizing (dampening unwanted vibrations of) the structure of interest. The signal applied to link 11 may be derived from an oscillator circuit or a control processor. As the specific characteristics of the driving signal are unnecessary for an understanding of the present invention, they will not be described here. Still, for purposes of providing an exemplary embodiment, the signal on link 11 may be assumed to vary between a very low frequency on the order of 1/10 Hz up to approximately 500 Hz, having a magnitude which is translatable into force units, (such as Newtons) on the secondary output arm of the motor.

Summing node 12 differentially combines the force input signal on link 11 and a position feedback control signal on link 34. The position feedback control signal represents an integration of the deviation of the dc motor secondary member from its prescribed center position over some extended period of time, which is considerably larger (in excess of an order of magnitude) than the maximum period of oscillation of input force 11. In effect, the signal on link 34 corresponds to long term positioning inaccuracies of the dc motor moveable secondary member due to such influences as the friction of roller bearings that support the moveable secondary member and other undesirable forces which may be simply termed as unwanted noise.

The output of summing node 12 is coupled over link 13 to a pulse width modulator 14, the output of which is coupled over link 15 to the primary drive coils of a linear dc motor 21. The use of a pulse width modulator to supply driving current to the primary of the motor simplifies the circuitry hardware for implementing the system and is very power efficient. It also permits highly accurate control of the drive current to the motor. Both of these aspects of the present invention are particularly noteworthy in an environment such as a spaceborne structure where payload, power and manipulation precision are critical design factors.

The drive current to the linear dc motor 21 is monitored through a feedback loop including link 24, a force feedback network 31 and link 32 which is coupled as a negative feedback link to pulse width modulator 14. The effect of the force feedback loop is to maintain the application of a constant force to the secondary member of the linear dc motor 21, corresponding to the level of the force input supplied on input link 11. Link 24 is coupled to the primary windings of the motor 21 and supplies a primary current sensing signal which is directly proportional to the secondary member translation force generated by the motor.

In order to control the application of drive current to the primary coil of linear dc motor 21 and thereby control the translation or movement of its secondary member, both the position (relative to center) and movement of the output arm are monitored. These tasks are accomplished by an opto-electronic commutation/position feedback loop including a commutation/position sensor 23 which is optically coupled to encoded reflective tracks on the secondary member of the linear dc motor via an optical coupling link 22 and supplies commutation control signals via link 26 to commutation circuitry of pulse width modulator 14 that commutates the primary current to the dc motor 21. Position sensing information which is employed to maintain long term stabilization or centering of the secondary member, as noted previously, is coupled over link 25.

Referring now to FIGS. 2-5, the structural and electrical configuration of the linear dc motor employed in accordance with the present invention will be described. As shown therein, the motor is comprised a primary winding 41 split into a pair of parallel-connected coil sections 41A and 41B wound as conventional three phase Y driving coils, having inputs A, B, C, as schematically illustrated at 42A and 42B in FIG. 2. Each three phase Y-connected coil is wound about an air core. Unlike typical three phase Y windings, the primary drive coils of the dc motor of the present invention do not employ iron cores, in order to prevent what would otherwise be an undesirable end effect reluctance cogging with respect to the series of permanent magnets of which the linearly moveable secondary arm is formed, as explained supra.

Figure 2:
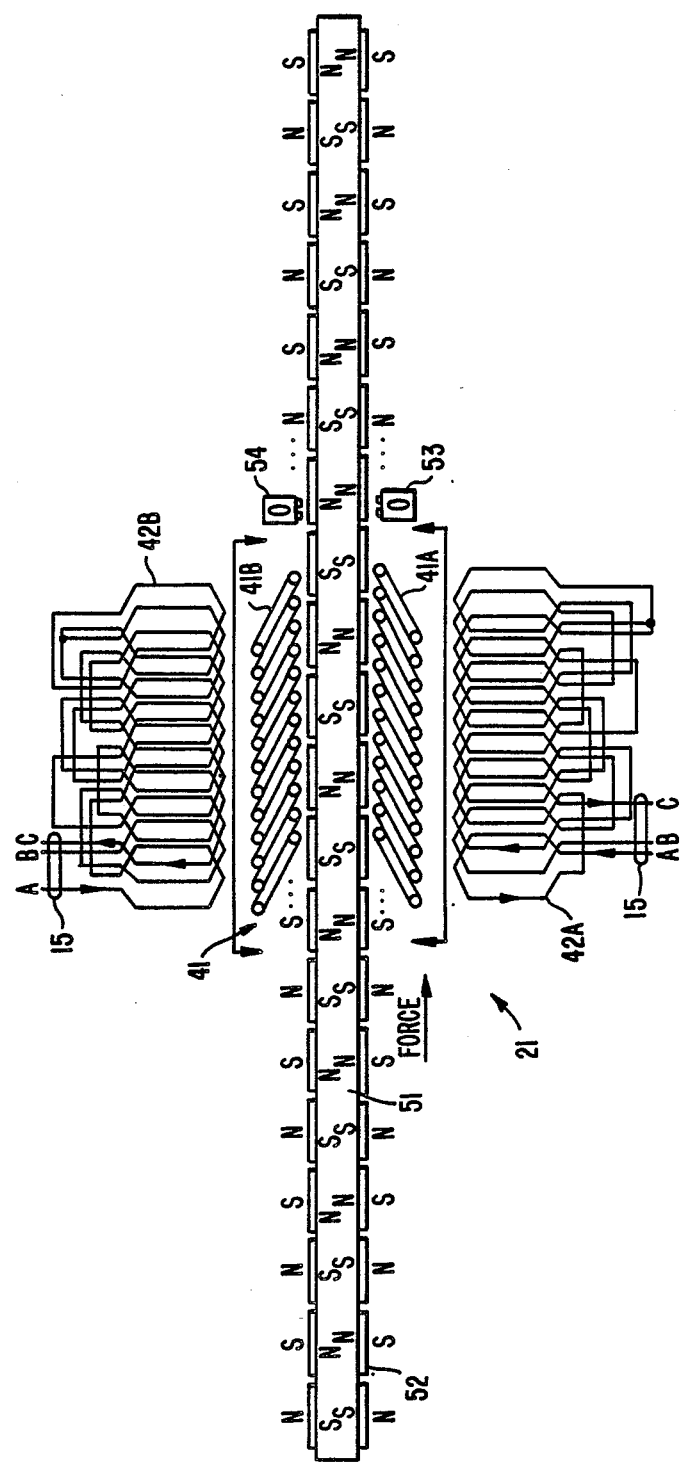
FIG. 2 is a diagrammatic/schematic illustration of the arrangement of the primary winding and translatable secondary member of the linear dc motor 21 of FIG. 1.
Figure 3:
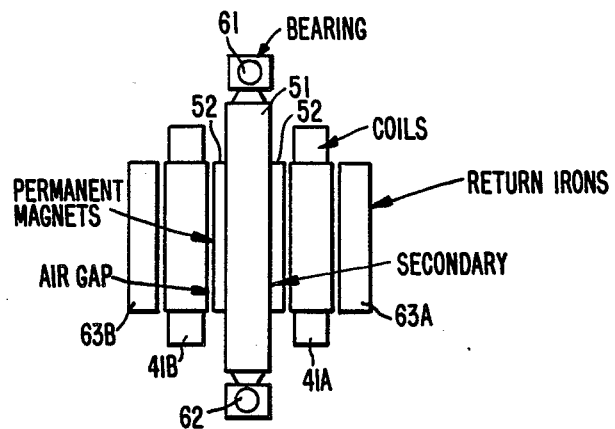
FIGS. 3, 4 and 5 are respective end, perspective and side views of the linear dc motor diagrammatically shown in FIG. 2.
Figure 4:
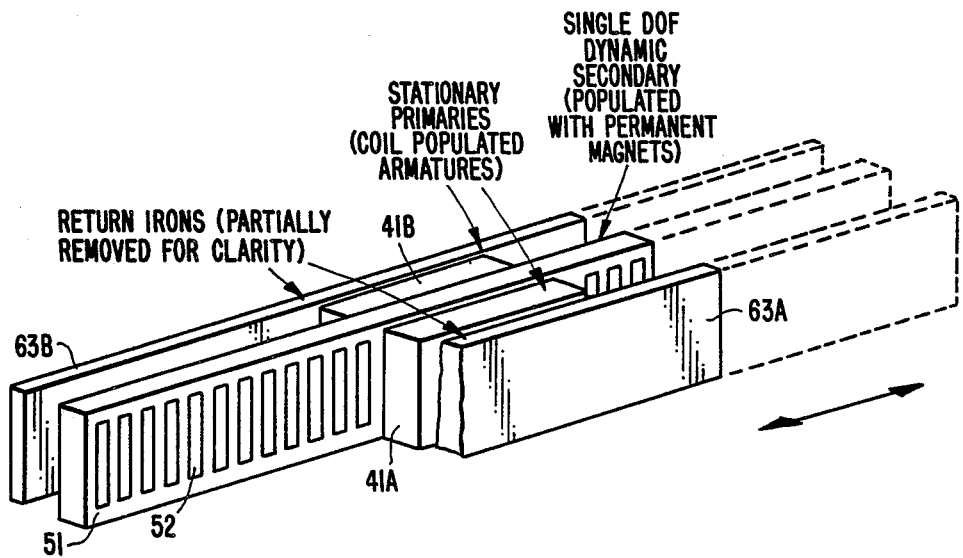
Figure 5:
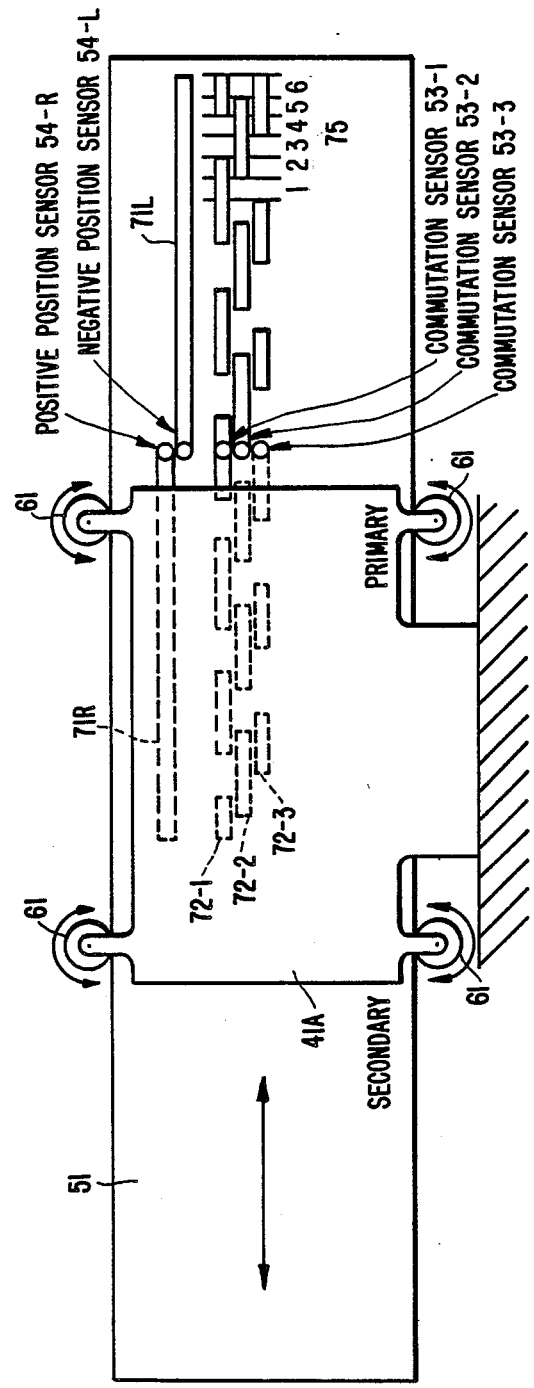

The secondary member comprises a rectilinearly-shaped iron bar 51, on the sides of which facing the primary drive coils 41A and 41B are distributed a plurality of rectangularly shaped permanent magnets or magnetic pole pieces 52, the surface magnetic polarizations of which alternate between north and south poles facing the primary drive coils along the length of the moveable secondary, as shown in FIG. 2. Secondary member 51 is supported for travel relative to primary winding 41 by one or more sets of low friction bearings 61, as schematically shown in FIGS. 3 and 5. The range of travel of secondary member 51 includes the force stroke and expected displacement of the structure on which the motor is to be mounted for effecting vibration compensation.

For minimizing the effective air gap of the return field generated between the primary drive coils 41A, 41B and the permanent magnets 52, a pair of return iron pieces 63A and 63B are disposed adjacent to the primary drive coils 41A and 41B at the sides thereof opposite the sides facing the distribution of permanent magnets 52 on the secondary member 51, as shown in FIG. 3. These return iron sections effectively minimize the reluctance of the return field flux generated by the primary drive coils 41A, 41B in order to maximize the available force that can be applied to the secondary member 51.

Sensing of the position and movement of the secondary member 51 is accomplished by a commutation sensor unit 53 and a centering position sensor unit 54, diagrammatically shown in FIGS. 2 and 5. Both sets of sensors are optical sensors, positioned to detect light reflected from sets of reflective commutation and position stripes 72 and 71, respectively, shown in FIG. 5. The commutation stripe set 72 is shown as comprising three parallel and linearly arranged optically reflective encoded stripes 72-1, 72-2 and 72-3. These respective stripes form a commutation pattern corresponding to a modified Gray code. By arranging a respective commutation sensor 53-1, 53-2, 53-3 for each stripe 72-1, 72-2, 72-3, respectively, along a line orthogonal to the direction of the travel of the stripes 72-1, 72-2, 73-3, as the secondary member 51 is moved back and forth in response to the energization of the primary winding 41, the combined outputs of the commutation sensors 53-1, 53-2, 53-3 produce only one change per commutation state (of the six possible commutation states shown at 75).

Commutation of the coils of parallel-connected field windings 41A, 41B is exclusively a function of position between primary winding 41 and secondary member 51. Force reversal is effected by a change in current flow direction for three current conditions common to any commutation state for the three phase Y-connected coils: positive current flow (into a coil terminal), negative current flow (out of a coil terminal), and no current flow. The primary coils are driven two-of-three according to the commutation sequence shown in FIG. 13, to be discussed infra, with the commutation changed by three states per pole displacement (pole pitch) for a total of six commutating states per alternating pole pair. For the position of secondary member 51 shown in FIG. 5, the motor secondary is positioned in the center of a commutation region identified in FIG. 13 as commutation sequence state 1. The encoded optically reflective stripe patterns effectively relax the need to precisely align the sensors without ambiguity at boundaries between the reflective and nonreflective portions of the commutation stripes.

Sensing of the position of the secondary member relative to the primary winding may be accomplished by providing one or more position-sensing optically-reflective stripes on the side of the secondary member 51 and disposing one or more optical sensor units to receive light reflected therefrom. In the presently described embodiment, position-sensing is effected using a pair of position-sensing stripes and associated optical sensors. More particularly, the position-sensing stripes (which may be disposed on either the same side or the opposite side (as shown in FIG. 2) of the secondary member 51 include a first rectilinear reflective stripe 71R and a second rectilinear reflective stripe 71L which are offset from one another in the manner shown in FIG. 5 and extend in mutually opposite directions parallel to the direction of travel of the secondary member 51. The total lengths of the stripes are sufficient to accommodate the maximum translation of the secondary member 51 in either of its two opposite directions of travel. As viewed in FIG. 5, position sensing stripe 71L reflects light into optical sensor 54L when the secondary member 51 is positioned to the left of center, while stripe 71R reflects light into an optical sensor 54R when the secondary member 51 is positioned to the right of center. When both optical sensors 54L and 54R receive light reflected from respective stripes 71L and 71R, the secondary member 51 is effectively centered relative to the primary winding 41.

As pointed out above, the centering position outputs are employed to provide a feedback signal to node 12 for compensating for a long term tendency of the secondary member 51 to prefer (spend more time in) one direction of travel versus the other. Although primary winding 41 is driven with an oscillating signal which causes the secondary member 51 to travel back and forth in accordance with a prescribed force input characteristic, integration of the movement of the secondary member 51 over a period of time considerably greater than the period of the lowest frequency signal applied to the primary coil 41 should result in the secondary member 51 being effectively centered relative to the primary coil 41. The outputs of commutation sensors 54R and 54L are employed to correct for departure from this effective centering.

The outputs of commutation sensors 53-1, 53-2 and 53-3 are coupled to a commutation logic circuit through which drive current for energizing the respective three phase Y coils of the primary 41 is controlled. The manner in which the individual coils of the primary are energized in response to the outputs of commutation sensors 53-1 . . . 53-3 will be described below in conjunction with the description of FIGS. 9 and 13.

Figure 6:
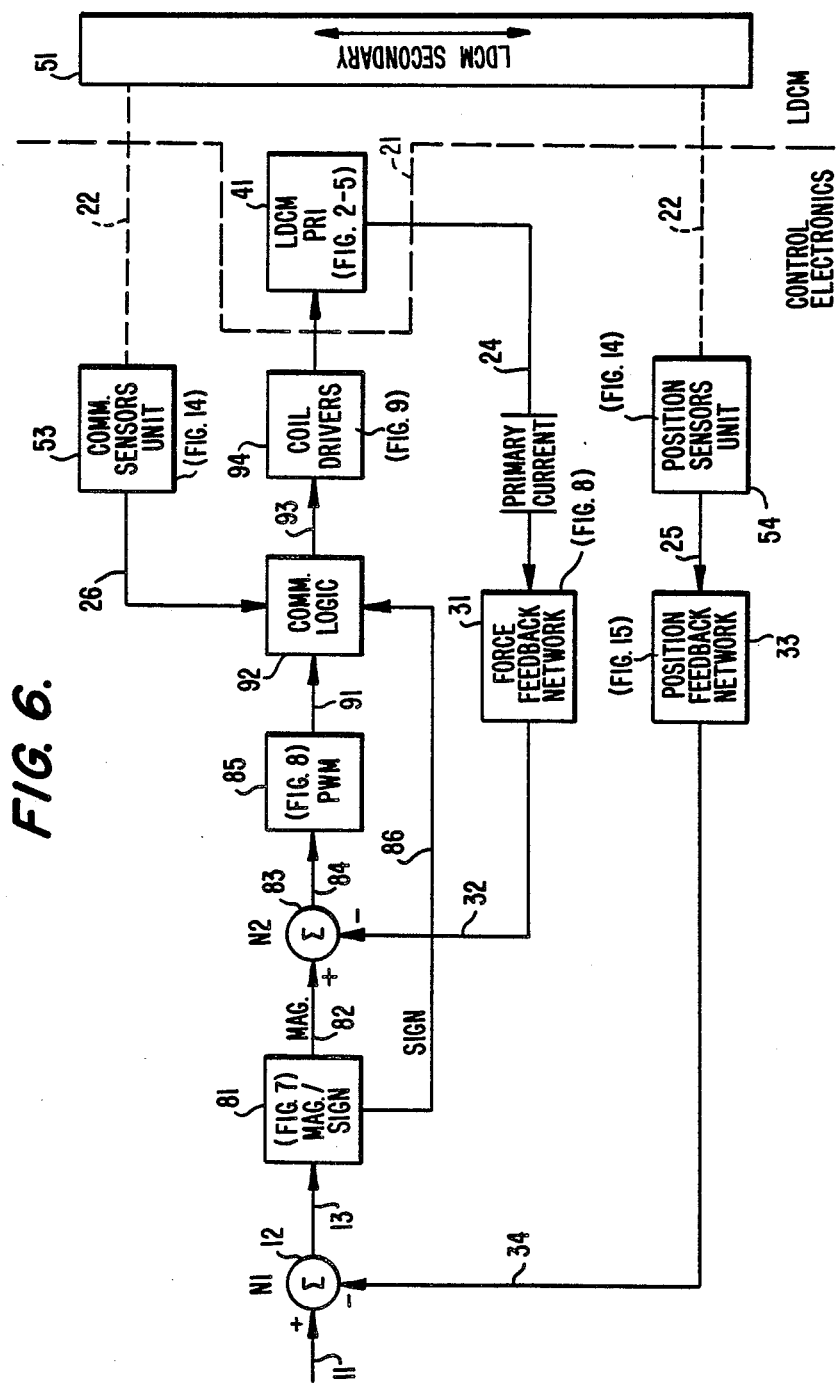
FIG. 6 is a block diagram of the components of the linear dc motor vibration controller for implementing the linear functional blocks illustrated in FIG. 1.

Referring now to FIG. 6, there is shown a diagrammatic illustration of the respective components of which the linear dc motor vibration controller of the present invention is comprised for implementing the functional system diagram shown in FIG. 1, described above. As pointed out in conjunction with the description of FIG. 1, the excitation current for driving the primary winding 41 of linear dc. current motor 21 is controlled by a pulse width modulation of the input current, so as to provide for improved precision and power efficiency and reduced circuit complexity of the system control electronics. Because the current drive to the motor coils must have both positive and negative polarities in order to move the secondary member 51 in mutually opposite directions relative to the position of the primary winding 41, some mechanism must be provided for conveying the polarity information to the coil drivers for the primary winding. This is accomplished in accordance with the present invention by separating the magnitude and sign information contained within the force input signal applied over input link 11.

More specifically, as shown in FIG. 6 and as described previously in connection with the description of FIG. 1, a control force input signal of interest is coupled over an input link 11 and applied to a summing node 12. The output of summing node 13, which represents the force input on link 11 minus a long term position error/drift correction signal on link 34, is coupled over link 13 to a magnitude/sign derivation unit 81 (the details of which will be described below in conjunction with the description of FIG. 7). Magnitude/sign derivation unit 81 extracts the magnitude of the input signal on link 13 and supplies a force magnitude representative signal over link 82 to a summing node 83. The sign or polarity of the signal on link 13 is coupled over link 86 to a downstream commutation logic unit 92. Node 83 differentially combines the force feedback information on link 32 (supplied from a force feedback network 31 to be described below with reference to FIG. 8) with magnitude information on link 82 and couples a resultant force magnitude signal over link 84 to a pulse width modulator or (PWM) unit 85 (to be described in detail below in conjunction with the description of FIG. 8). Pulse width modulator unit 85 generates an output pulse train signal having a prescribed frequency and a pulse width which depends upon the magnitude of the signal supplied over input link 84. This signal is supplied over link 91 to commutation logic unit 92. Commutation logic unit 92 responds to the pulse width modulated signal on link 91, the polarity signal on link 86 and commutation signals on link 26 from the commutation sensor unit 53 comprising commutation sensors 53-1, 53-2, 53-3 (described above in conjunction with the description of FIG. 5 and to be discussed below in conjunction with the description of FIG. 14), and selectively applies excitation current to the coil drivers 94 (to be described below with reference to FIG. 9) which feed the primary 41 of the linear dc motor 21, shown schematically in the right-hand portion of FIG. 6. Commutation logic unit 92 performs a function effectively corresponding to a look-up table and may comprise combinational logic or a programmable read only memory (PROM). The output of commutation logic 92 selectively opens and closes a set of commutation switches through which excitation current for the respective coils of the Y-configured three phase primary winding 41 are driven, as will be described in detail below in conjunction with the description of FIG. 9.

As mentioned briefly above in connection with the description of FIG. 1, it is desirable that the force applied to the secondary member 51 of the linear D.C. motor be predictable and effectively constant in accordance with the input current applied to the primary windings. For this purpose, force feedback network 31 is coupled to an input link 24 from the primary coil 41 of the motor and supplies a negative feedback signal over link 32 to summing node 83.

Also shown in FIG. 6 is the low frequency, low gain position stabilization feedback loop including position sensor unit 54 (containing position sensors 54L, 54R described above with reference to FIGS. 2 and 5) which is optically coupled (as shown by dotted lines 22) to the position stripes 71L and 72R (not shown in FIG. 6) on the side of the movable secondary member 51. The output of position sensor unit 54 is coupled over link 25 to a position feedback network 33, to be described in detail in FIG. 15. Position feedback network 33 provides a correction signal over link 34 to be differentially combined at node 12 with the force input signal on link 11.

Figure 7:
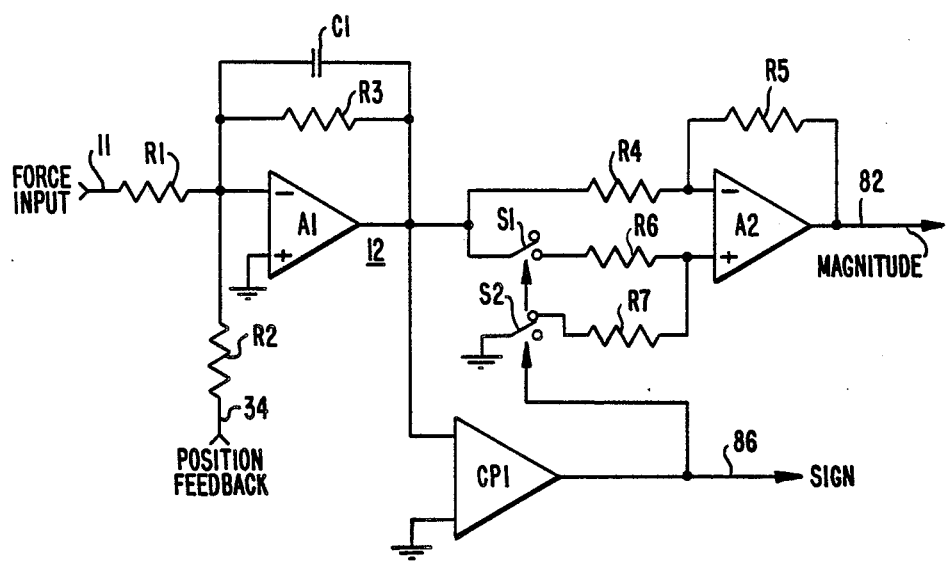
FIG. 7 is a detailed schematic illustration of the components of the magnitude/sign derivation circuit 81 of FIG. 6.

Referring now to FIG. 7, the circuitry configuration of the summing node 12 and magnitude/sign derivation unit 81 of FIG. 6 will be described in detail. As shown therein, summing node 12 is effectively composed of a summing amplifier A1 having a first input resistor R1 coupled to force input link 11 and a second input resistor R2 coupled to feedback link 34. Capacitor C1 and resistor R3 are coupled between the input and output of amplifier A1 as a low pass filter. The output of summing amplifier A1 is coupled to one input of a threshold comparator CP1, the other input of which is grounded, as shown. The output of amplifier A1 is also coupled to the negative input of a unity gain amplifier A2 (functioning as a full wave rectifier) through resistor R4 and through a controlled switch S1 and a resistor R6 to the positive input terminal of unity gain amplifier A2. The feedback resistor R5 of amplifier A2 matches the input resistance of resistor R4 and is twice the resistance of each of resistors R6 and R7 for input offset current balancing. Resistor R7 is coupled through a switch S2 to ground. Each of switches S1 and S2 is selectively controlled by the output of threshold comparator CP1 on link 86.

In operation, when a force representative input signal supplied over link 11 to amplifier A1 has a positive polarity, the output of threshold comparator CP1 (relative to ground) has a positive polarity so that a positive unity voltage level is applied over link 86. The magnitude information is derived from the output of amplifier A2 on link 82. For negative going signals, the output of comparator CP1 changes state, closing switch S1 and opening switch S2. Since the output of amplifier A1 is now applied to the positive input of amplifier A2, it is inverted with unity gain (from the input 11) at the output of amplifier A2, so that the signal level on link 82 again represents only the magnitude of the force control signal, the negative polarity of which is represented by a negative unity voltage signal on link 86.

Figure 8:
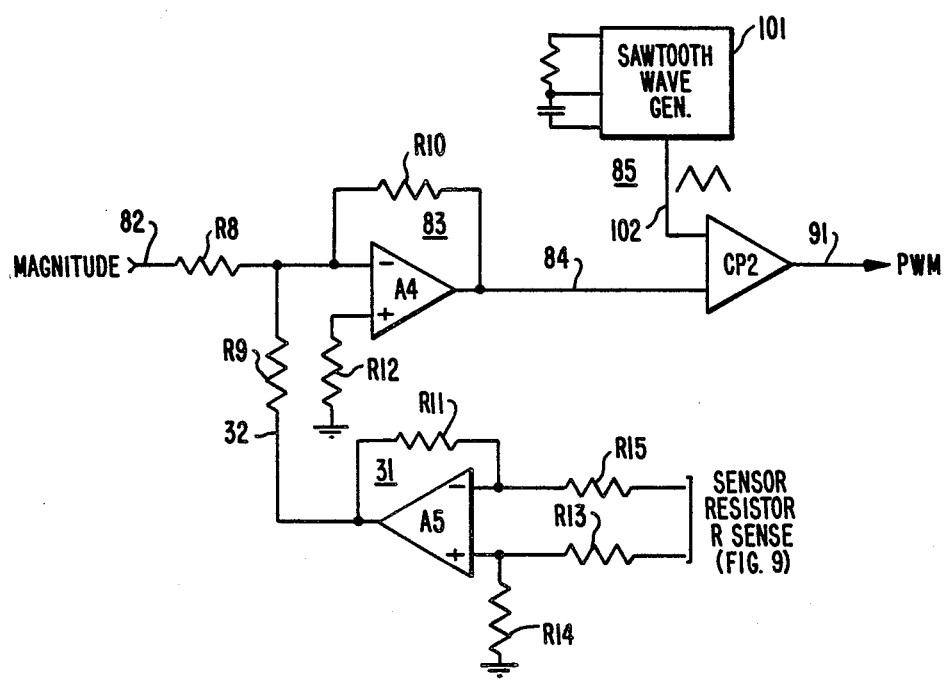
FIG. 8 is a detailed schematic diagram of the components of the pulse width modulator 85 of the system diagram shown in FIG. 6.
Figure 9:
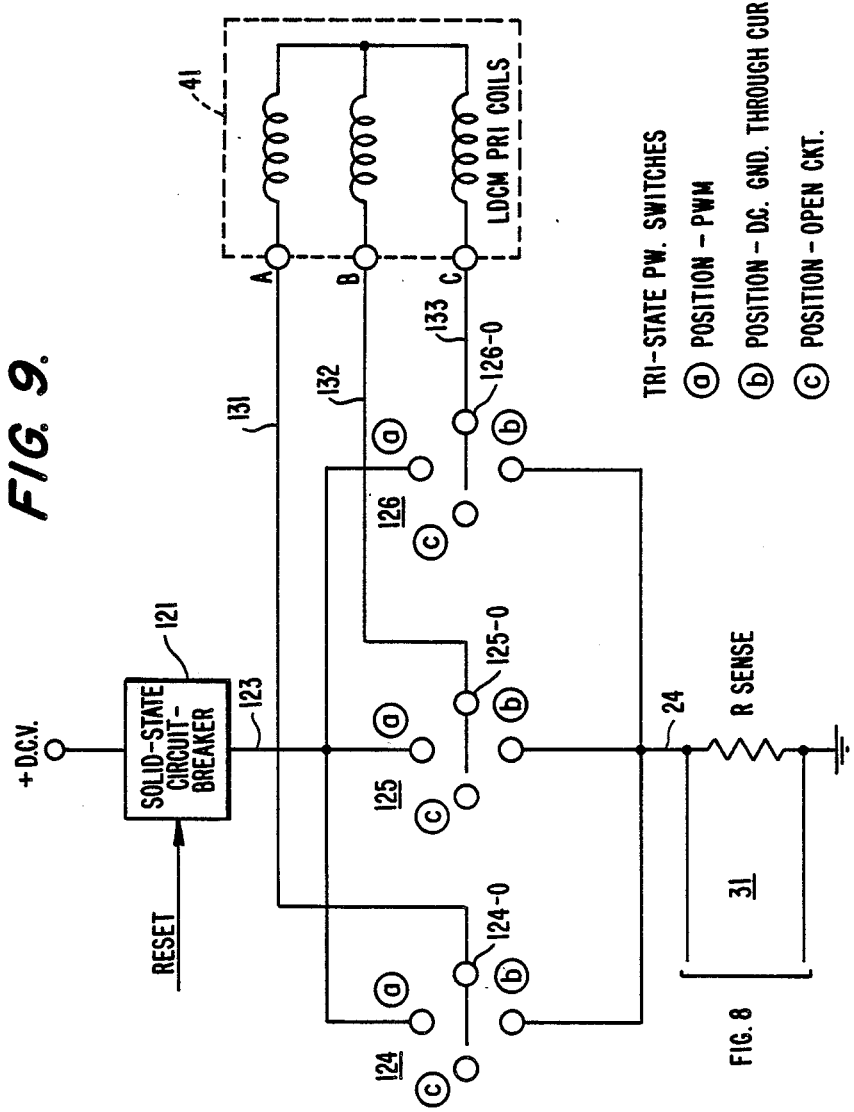
FIG. 9 is a diagrammatic illustration of the make-up of the coil driver unit 94 interfacing the output of the commutation logic and the primary coil 41 of the system diagram shown in FIG. 6.

Referring now to FIG. 8, the circuitry configuration of summing node 83, pulse width modulator 85 and force feedback network 31 (also partially illustrated in FIG. 9) are schematically illustrated. Input link 82 from amplifier A2 within magnitude/derivation unit 81 shown in FIG. 7 is coupled through a resistor R8 to the negative input of a summing amplifier A4. Summing amplifier A4 has its positive input coupled through resistor R12 to ground and has a feedback resistor R10 coupled between output link 84 and its negative input. Resistor R12 serves to balance input offset currents of amplifier A4. Summing amplifier A4 effectively corresponds to summing node 83 of the system diagram of FIG. 6. Also coupled to the negative input of summing amplifier A4 is an input resistor R9 which is coupled to the feedback loop 32 from an amplifier A5. Amplifier A5 has its respective positive and negative inputs coupled through input resistors R13 and R15 to the negative (ground) and positive force feedback portions of a link connected across a force feedback sense resistor R SENSE (FIG. 9). A feedback resistor R11 is coupled between the negative input and output of amplifier A5 while a resistor R14 is coupled between the positive input and ground. Amplifier A5 effectively scales the monitored feedback current to be combined via link 32 with the force magnitude voltage on link 82 for driving the pulse width modulator.

The pulse width modulator may comprise a saw tooth generator 101, the output of which is coupled over link 102 as one input to a comparator CP2. The other input of comparator CP2 is coupled to link 84. The output of comparator CP2 on link 91 represents the length of time that the voltage level on link 102 exceeds the reference level on link 84, corresponding to the force magnitude information (corrected by the force magnitude feedback signal on link 32). As a result, the output signal on link 91 is a pulse width modulated signal the pulse duration of which, as noted above, depends upon the length of time that the sawtooth output on link 102 exceeds the voltage on link 84.

Referring again to FIG. 6, commutation logic unit 92, which receives the pulse width modulated output signal on link 91, also responds to the sign signal on link 86 and to commutation inputs on link 26 from the commutation sensor unit 53, so as to supply a set of coil excitation signals to coil driver unit 94. As the details of commutation logic unit 92 are unnecessary for an understanding of the present invention, they will not be described here. As noted above, such a unit may be comprised of combinational logic, including a programmable read only memory, which produces a set of output control signals to the coil driver circuitry to be described below in conjunction with FIG. 9. The sequencing of the coil driver circuitry in accordance with the commutation sensor outputs, the pulse width modulation and sign information signals on links 91 and 86, respectively, will be described below in connection with FIG. 9 and the tabulated matrix shown in FIG. 13.

Referring now to FIG. 9, for the three phase Y-connected coils of primary winding 41 having inputs A, B, C, coil driver unit 94 is comprised of a set of three controlled switches schematically shown as three pole, single throw commutation switches 124, 125 and 126. A first pole (a) of each switch is connected via link 123 to a solid state switch (circuit breaker) 121. Commutation switches 124-126 may comprise conventional HEXFETs, bipolar transistors, etc. for controllably supplying the high voltage output of solid state circuit breaker 121 to selected ones of the coils inputs A, B and C of the primary winding 41 via respective outputs 124-0, 125-0, 126-0. Switch 121 is coupled to a high d.c. voltage supply for supplying excitation current to the primary winding 41. Control of switch 121 is effected via a separate bi-level on-off or circuit breaker reset command. Second poles (b) of each of switches 124-126 are coupled over link 24 to a sensing resistor R SENSE which forms part of force feedback network 31, described above in connection with the description of FIG. 8. Pole (c) of each of switches 124, 125 and 126 represents a neutral switch position. Thus, each of switches 124, 125, 126 respectively connects its output 124-0, 125-0, 126-0 to one of the three poles (a), (b) and (c) and thereby links 131, 132 and 133 to the respective inputs A, B, C of the primary winding 41.

As noted above, commutation logic unit 92 is connected to receive the pulse width modulated signal on link 91 from pulse width modulator 85. As a result, each of commutation switches 124-126 receives a pulse width modulated signal when in position (a), producing an output such as that illustrated in FIG. 10, corresponding to a chopped high D.C. voltage, the pulsation of which depends upon the magnitude of the force representative input signal 83, as shown in FIG. 11. As can be seen from the commutation switch arrangement shown in FIG. 9 and the commutation sequence matrix shown in FIG. 13, for each state of operation only one of the coils of the primary winding 41 will have its A, B, or C input operating as a pulse width modulated voltage. Similarly, only one of the coils will have its input connected to the sense resistor R SENSE and the remaining coil will be connected to a neutral and an open circuit (represented by the zero in FIG. 13). Consequently, the current flow through sense resistor R SENSE is always from node (b) through sense resistor R SENSE to ground. In effect, therefore, the voltage level across sense resistor R SENSE corresponds to the magnitude of the force being applied, namely proportional to the drive current to the primary 41, which is scaled in force feedback network 31, as pointed out previously. This changing voltage characteristic on link 32 is shown in FIG. 12, approximating a piece-wise rectilinear changing voltage riding on the force profile input signal on link 82. Since, as noted above, pulse width modulator unit 85 responds to only magnitude information, it can be seen that, by virtue of the circuit connection shown in FIG. 9, only magnitude information is fed back to summing node 83, so that interfacing between the primary current detection loop and the pulse width modulator control input is simplified.

Figure 14:
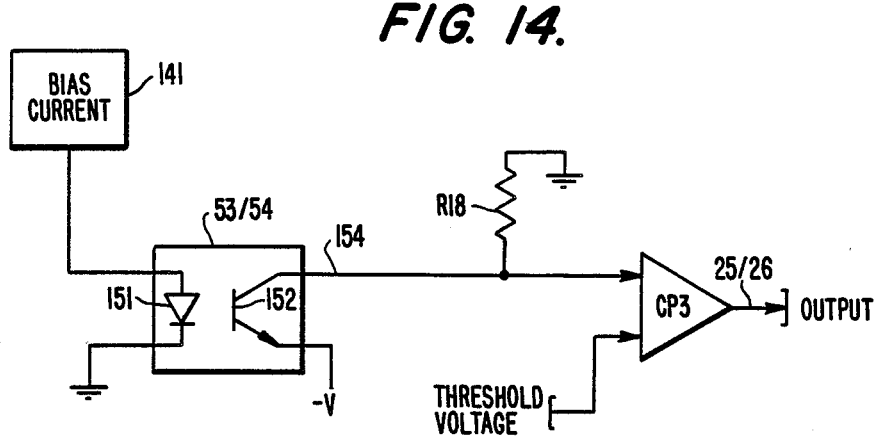
FIG. 14 is a detailed schematic diagram of the configuration of the commutation and position sensor units 23 of the system diagram shown in FIG. 6.

FIG. 14 schematically illustrates the configuration of each of the opto-electronic commutation and position sensor units 53 and 54 shown in FIG. 6. Since the circuitry configuration of each sensor is the same, it is to be understood that the illustration in FIG. 14 and the description to follow relates to an individual sensor and output circuit for each of the sensor components within the commutation sensor unit 53 and position sensor unit 54. As shown in FIG. 14, each individual sensor (such as commutation sensor 53-1 within commutation sensor unit 53) is comprised of a light emitting diode 151, the anode of which is connected to a source of bias current 141 and the cathode of which is coupled to ground. Light emitting diode 151 is arranged to direct light towards the side of the movable secondary arm of the linear D.C. motor at an associated region where the position or commutation stripe of interest is located. Light reflected off the stripe is detected by an associated phototransistor 152, the emitter of which is connected to a bias voltage and the collector of which is grounded through a bias resistor R18. The collector is further coupled to a threshold comparator (having hysteresis) CP3, the output of which represents whether or not the voltage level at the output of phototransistor 152 exceeds a prescribed reference threshold. Namely, when a reflective portion of the position or commutation sensor stripe on the secondary arm is located adjacent to the sensor element of interest, the magnitude of the optical input to the phototransistor 152 will exceed the threshold of the comparator CP3 and produce a first prescribed binary output. Otherwise, the output is in a second of the two possible binary states of the threshold comparator. Thus, for each of the commutation sensors within unit 53, the outputs of their associated comparators CP3 will be supplied over link 26 to commutation logic unit 92 to provide a combined commutation logic sequence corresponding to one of the commutation states 1-6 illustrated in FIG. 13.

As noted above, in accordance with the present invention, by using optical sensors for position sensing, the location of the moveable secondary arm can be more precisely defined than through the use of other sensing mechanisms, such as Hall effect devices, which rely upon magnetic flux density, whose transitions are not as clearly defined as in the optical devices. The optical sensing thereby provides a smoother commutation due to a clearer demarcation of the switching positions along the commutation stripes.

Figure 15:
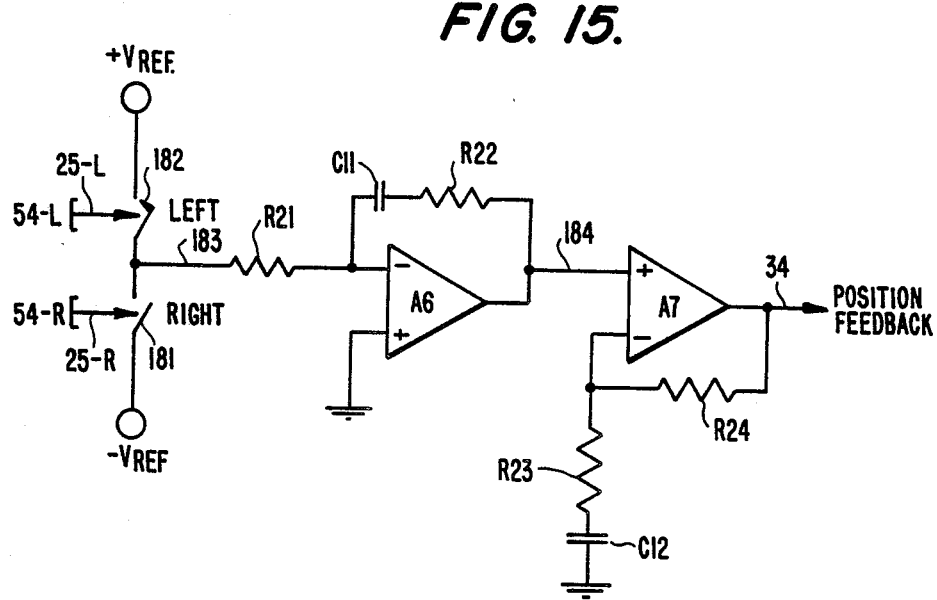
FIG. 15 is a detailed schematic diagram of the position feedback network 33 shown in the system diagram of FIG. 6.

The outputs of opto-electronic position sensors 54-1 and 54-2, shown in FIG. 5, are coupled to the position feedback network 33, shown in detail in FIG. 15. Link 25-L is coupled to control the selective closure of a switch 181 while link 25-R is coupled to control the selective closure of switch 182. Switch 181 is coupled between a negative reference voltage and a link 183, while switch 182 is coupled between a positive reference voltage and link 183. Link 183 is coupled to input resistor R21 of integrating amplifier A6. The feedback network of amplifier A6 consists of an integration network including resistor R22 and capacitor C11. The effective time constant of the integrator is considerably longer than the maximum period of the variable force input that may be applied to the primary winding of the linear D.C. motor, as noted previously. The output of amplifier A6 is coupled over link 184 to a compensation network including amplifier A7, resistors R23 and R24 and capacitor C12. The output of compensation network A7 is coupled over link 34 to summing node 12.

In operation, during excursions of the movable secondary member of the linear dc motor to the right of the primary coil as viewed in FIG. 5, sensor 54-R will produce an output, causing a signal to be supplied over link 25-R to close switch 181 and supply a negative input voltage to integrator A6. During those periods of time the secondary is positioned to the left of center, position sensor 54L will generate an output to close switch 182, supplying a positive voltage to the input of integrator A6. Since the bandwidth of the compensation network is well below the bandwidth of the force input applied over link 11, high frequency signals are ignored and only the long term off-center effects are evaluated. Any long term effects which produce a net result other than zero (corresponding to an equal travel time of member 51 to the right of center and equal time to the left of center) produces a signal which is applied over link 34 to be combined with the force input on link 11 for correcting for the long term drift. Thus, the stroke of the secondary member is kept symmetrical about a nominal center. Preferably, the center position of the secondary member is located in the middle of the commutation interval where the force produced by the primary windings of the linear dc motor is maximum, most linear and free of commutation-induced effects.

As will be appreciated from the foregoing description, the present invention provides an improved linear force actuator system for stabilizing a support structure through the use of a linear dc motor whose primary winding is driven by a pulse width modulation control signal representative of a force input, through which the secondary member of the motor is to be controllably translated. For improved control accuracy, the actuator system of the invention employs a pair of feedback loops, one of which monitors the current in the motor's primary winding to maintain a constant force output to the secondary member, and a secondary of which monitors long term deviations from center of the secondary member and corrects for centering offsets. An optoelectronic position sensing arrangement monitors the movement of the secondary member whereby precise control of commutation of the coils of the primary winding and a smooth translation of the secondary member are obtained.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a structure that is subject to vibrational movement, a system for imparting a controlled dampening force to said structure so as to counter said vibrational movement comprising:
    a moveable mass to be translated in an oscillatory movement with respect to said structure and thereby impart to said structure a vibrational movement-compensating force against which said structure reacts, so that the vibrational movement thereof may be effectively countered by the controlled movement of said mass; and
    first means, mechanically attached to said structure at a location whereat said vibrational movement may occur, for providing a rectilinear travel path for said mass to be translated there along in an oscillatory manner and for imparting a controlled force to said mass so as to cause said mass to oscillate along said rectilinear travel path; and wherein
    one of said movable mass and said first means comprises a winding of an electric motor and the other of said mass and said means comprises a linear magnetic field responsive element, magnetically interacting with said winding of said electric motor, so that said winding may impart a force to said element, and wherein
    the oscillatory translation of said movable mass is controlled exclusively by controlled magnetic field interaction between said winding and said linear magnetic field responsive element.

2. A system according to claim 1, wherein said first means comprises a primary winding of a linear direct current motor magnetically coupled with said mass, for generating a magnetic field having a controlled characteristic, in response to which said mass is controllably rectilinearly oscillated with respect to said electric motor winding and said mass comprises a rectilinear secondary actuator element coupled with said primary winding and rectilinearly moved thereby along said rectilinear travel path in response to the generation of a controlled magnetic field by said primary winding.

3. A system according to claim 2, further including second means, coupled with said rectilinear secondary actuator element, for generating an output representative of the movement of said rectilinear secondary actuator element relative to a prescribed location on the travel path of said rectilinear secondary actuator element; and
    third means, coupled to said first and second means, for controlling the generation of said magnetic field by said primary winding and, consequently the rectilinear movement of said rectilinear secondary actuator element thereby, in response to a prescribed force input representative signal and in accordance with the output generated by said second means.

4. A system according to claim 1, further comprising second means for monitoring the displacement between said winding and said element on the travel path of the movable one thereof and measured the length of time that displacement therebetween is effectively positioned to one side of a predetermined location on said travel path and measuring the length of time that the displacement therebetween is effectively positioned to a second side of said predetermined location; and
    third means, coupled said winding and said second means, for adjusting the energization of said winding in accordance with a difference in the length of time measurement carried out by said second means over a prescribed time interval in excess of the period of the lowest frequency of oscillation imparted to said moveable mass.

5. A system according to claim 3, wherein said rectilinear secondary actuator element comprises an elongated low magnetic reluctance member having a plurality of magnetic pole pieces distributed along the periphery thereof in the direction of movement of said member and wherein said primary winding is arranged symmetrically with respect to the axis of travel of said member.

6. A system according to claim 5, wherein said primary winding has a core made of non-magnetic, non-conductive material.

7. A system according to claim 6, further including a low magnetic reluctance element disposed adjacent to the periphery of said primary winding for providing a low reluctance return path for the magnetic field generated by said primary winding and interacting with the pole pieces of said member.

8. A system according to claim 3, wherein said second means comprises a digitally encoded reflectance pattern disposed along said rectilinear secondary actuator element, and optical detector means, disposed at a prescribed location with respect to said primary winding, for detecting respective values of said digitally encoded reflectance pattern as said rectilinear secondary actuator element is rectilinearly moved by the controlled generation of said magnetic field by the primary winding of said motor.

9. A system according to claim 8, further including
fourth means, coupled with said rectilinear secondary actuator element, for generating an output representative of the position of said rectilinear secondary actuator element relative to a predetermined location on the travel path of said rectilinear secondary actuator element; and
fifth means, coupled to said third and fourth means, for causing said third means to control the generation of said magnetic field by said first means in accordance with the output generated by said fourth means.

10. A system according to claim 3, wherein said third means includes means for generating a periodic pulse output signal the pulse width of which is representative of the magnitude of said prescribed force input.

11. A system according to claim 10, wherein said third means includes means for generating a signal representative of the direction of application of said prescribed force input to said rectilinear secondary actuator element.

12. A system according to claim 11, wherein said primary winding comprises a primary winding of a linear direct current motor and said rectilinear secondary actuator element comprises a moveable secondary member of said linear direct current motor magnetically coupled with said primary winding and rectilinearly moved thereby in response to the generation of a magnetic field controlled by said third means.

13. A system according to claim 12, wherein said third means includes means for controlling the generation of the magnetic field by said primary winding in accordance with said periodic pulse output signal and said direction of application representative signal.

14. A system according to claim 10, wherein said third means includes means, responsive to said prescribed force input representative signal, for generating a pulse width modulation signal in accordance with magnitude of said force input representative signal and a signal representative of the polarity of said force input representative signal.

15. A system according to claim 14, wherein said third means includes means for controlling the generation of said magnetic field by said primary winding in accordance with said pulse width modulation signal and said force polarity representative signal.

16. A system according to claim 3, wherein said third means includes means for controlling the generation of said magnetic field by said first means in accordance with the flow of current in said primary winding in response to said prescribed force input representative signal.

17. A system according to claim 16, wherein said third means includes means for generating a periodic pulse output signal the pulse width of which is representative of the magnitude of said prescribed force input.

18. A system according to claim 17, wherein said third means includes means, responsive to said prescribed force input representative signal, for generating a pulse width modulation signal in accordance with magnitude of said force input representative signal and a signal representative of the polarity of said force input representative signal.

19. A system according to claim 18, wherein said third means includes means for controlling the generation of said magnetic field by said primary winding in accordance with said pulse width modulation signal and said force polarity representative signal.

20. A system according to claim 19, wherein said third means includes means for adjusting said pulse width modulation signal in accordance with the flow of current in said primary winding.

21. For use with a space-deployed structure that is subject to vibrational movement, a system for imparting a controlled dampening force to said structure, so as to counter said vibrational movement comprising:
a linear direct current motor having a primary winding and a rectilinear secondary actuator element magnetically coupled therewith, so that, in response to the generation of a magnetic field by said primary winding, there is effective rectilinear oscillatory motion between said primary winding and said secondary actuator element; wherein
one of said primary winding and said rectilinear secondary actuator element is attached to said structure while the other of said primary winding and said rectilinear secondary actuator element is freely translatable with respect to said structure, whereby, in response to the generation of a magnetic field by said primary winding, there is relative movement between the other of said primary winding and said rectilinear secondary actuator element and said structure, so that a vibrational movement compensating force, against which said structure reacts, may be generated by said linear direct current motor, to thereby impart a controlled dampening force to said structure, and wherein
relative movement between said other of said primary winding and said rectilinear secondary actuator element and said structure is controlled exclusive by controlled magnetic field interaction between said primary winding and said rectilinear secondary actuator elements.

22. A system according to claim 21, further comprising means for monitoring the displacement between said primary winding and said rectilinear secondary actuator element on the travel path of the movable one thereof and measuring the length of time that displacement therebetween is effectively positioned to one side of a predetermined location on said travel path and measuring the length of time that the displacement therebetween is effectively positioned to a second side of said predetermined location; and means, coupled to said primary winding and said monitoring means, for adjusting the energization of said winding in accordance with a difference in the length of time measurement carried out by said monitoring means over a prescribed time interval in excess of the period of the lowest frequency of oscillation imparted to the freely translatable one of said primary winding and said rectilinear secondary actuator element.

23. A method of controlling vibration of a mechanical structure comprising the steps of:
  (a) coupling to said mechanical structure a linear direct current motor having a primary winding and a secondary member rectilinearly movable with respect to said primary winding, such that one of said primary winding and said secondary member is fixed with said mechanical structure and the other of said primary winding and said secondary member is movable with respect to said structure so as to be able to impart thereto a controlled linear inertial input by its movement;
  (b) applying a prescribed force input representative signal to said primary winding so as to cause the movable one of said primary winding and said secondary member to undergo a prescribed oscillatory rectilinear movement with respect to said mechanical structure and thereby effectively compensate for destabilizing vibrations of said mechanical structure resulting from force inputs other than said prescribed force input;
  (c) monitoring the relative movement between said primary winding and said secondary member on the rectilinear travel path of the movable one thereof and generating a signal representative of the location of displacement between said secondary member and said primary winding;
  (d) controlling the energization of said primary winding in accordance with the signal generated in step (c);
  (e) monitoring the displacement between said primary winding and said secondary member on the travel path of the moveable one thereof and measuring the length of time that the displacement between said primary winding and said secondary member is effectively positioned to one side of a predetermined location on said travel path and measuring the length of time that the displacement between said primary winding and said secondary member is effectively positioned to a second side of said predetermined location; and
  (f) adjusting the energization of said primary winding in accordance with a difference in the length of time measurements carried out in step (e) over a prescribed time interval in excess of the period of the lowest frequency of oscillation of said prescribed force input representative signal.

24. A method according to claim 23, further including the steps of:
  (g) controlling the energization of said primary winding in accordance with the flow of current in said primary winding in response to said prescribed force input representative signal.

25. A method according to claim 24, wherein step (b) comprises controllably applying a pulse width modulation signal to coils of said primary winding in accordance with prescribed force representative input signal and the signal generated in step (c).

26. A method according to claim 25, wherein step (c) comprises optically monitoring the relative movement between said primary winding and said secondary member.

27. A method according to claim 26, wherein step (e) comprises optically monitoring the relative displacement between said primary winding and said secondary member.

28. For use with a structure that is subject to vibrational movement, a method for imparting a controlled dampening force to said structure so as to counter said vibrational movement comprising the steps of:
  (a) providing a moveable means to be translated in an oscillatory movement with respect to said structure and thereby impart to said structure a vibrational movement compensating force against which said structure reacts, so that the vibrational movement thereof may be effectively countered by the controlled movement of said means; and
  (b) providing, at a location on said structure whereat said vibrational movement may occur, a rectilinear travel path of said moveable means to be translated therealong in an oscillatory manner;
  (c) imparting a controlled force to said moveable means so as to cause said moveable means to oscillate along said rectilinear travel path; and
  wherein one of said movable means and said rectilinear travel path comprises a winding of an electric motor and the other of said means and said rectilinear travel path comprises a linear magnetic field responsive element magnetically interacting with said winding of said electric motor, so that said winding may impart a force to said element, and wherein
  the oscillatory translation of said moveable means is controlled exclusively by controlled magnetic field interaction between said winding and said linear magnetic field responsive element.

29. A method according to claim 28, further comprising the steps of
  (d) monitoring the displacement between said winding and said element on the travel path of the movable one thereof and measuring the length of time that displacement therebetween is positioned to one side of a predetermined location on said travel path and measuring the length of time that the displacement therebetween is effectively positioned to a second side of said predetermined location; and
  (e) adjusting the energization of said winding in accordance with a difference in the length of time measurement carried out in step (d) over a prescribed time interval in excess of the period of the lowest frequency of oscillation imparted to said moveable means.

* * * * *